Oct. 18, 1955
H. WESSELS
2,720,739
HORIZONTAL REVOLVING HARROW
Filed Sept. 26, 1951
2 Sheets-Sheet 1
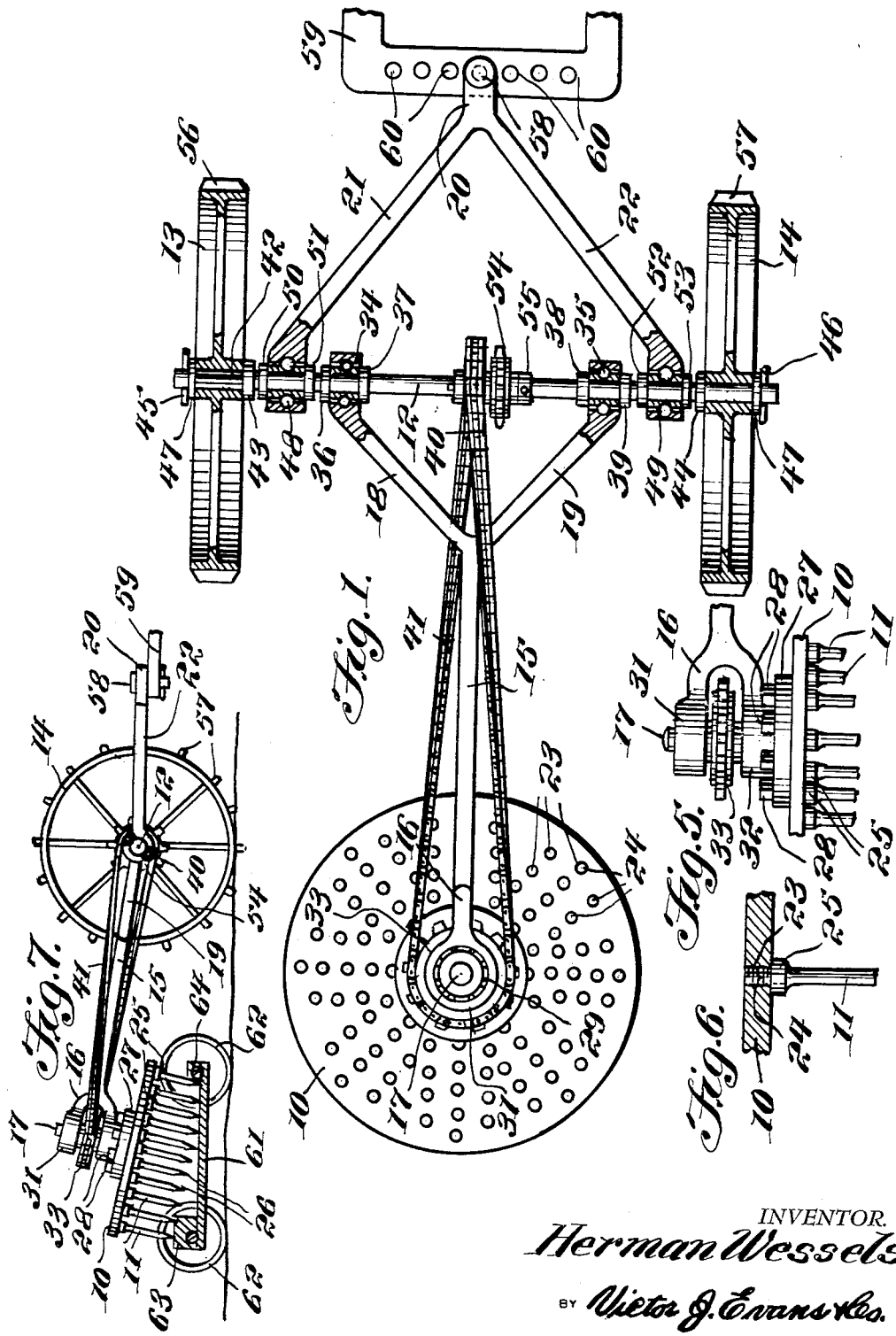
INVENTOR.
Herman Wessels,
BY Victor J. Evans & Co.
ATTORNEYS Oct. 18, 1955     H. WESSELS     2,720,739
HORIZONTAL REVOLVING HARROW
Filed Sept. 26, 1951     2 Sheets-Sheet 2
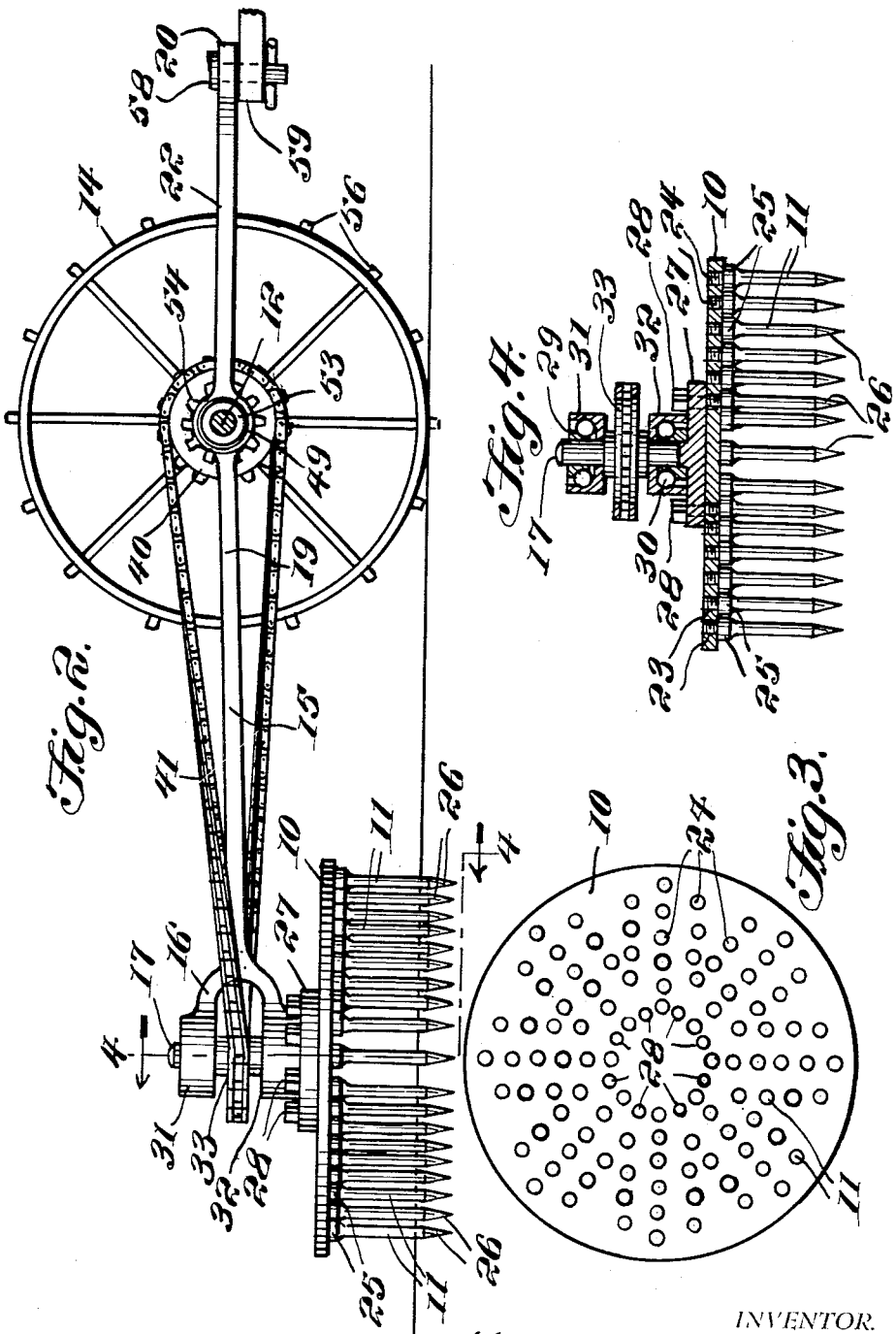
INVENTOR.
Herman Wessels,
BY Victor J. Evans & Co.
ATTORNEYS

United States Patent Office 2,720,739
Patented Oct. 18, 1955

2,720,739
HORIZONTAL REVOLVING HARROW
Herman Wessels, Sellersburg, Ind.

Application September 26, 1951, Serial No. 248,432

1 Claim. (Cl. 55—20)

This invention relates to farm implements of the type drawn by a tractor, and in particular a harrow formed with a horizontally positioned disc having vertically mounted depending teeth and means for mounting and rotating the disc whereby ground is broken up by the teeth as the disc is drawn over a field or the like.

The purpose of this invention is to provide an improved type of harrow whereby solid ground is substantially pulverized.

With the conventional type of disc or spring or rigid tooth harrow several operations are required to break up the ground sufficiently for planting. With this thought in mind this invention contemplates a harrow having a plurality of spaced vertically positioned teeth mounted in a horizontally disposed plate or disc whereby with the disc rotated horizontally the teeth work the ground a plurality of times as the harrow is drawn over the ground.

The object of this invention is, therefore, to provide a harrow wherein the contact of teeth thereof with soil is multiplied whereby with the harrow traveling cross wise of plowed furrows the soil is substantially pulverized in one operation.

Another object of the invention is to provide a horizontally revolving harrow wherein the parts are actuated by traction wheels of the harrow so that it is only neicessary to attach the harrow to a tractor and draw the harrow forwardly in order to operate the rotating elements.

A further object of the invention is to provide a harrow having a horizontally rotatable disc with harrow teeth depending therefrom which is of a simple and economical construction.

With these and other objects and advantages in view the invention embodies a harrow having a transversely disposed shaft journaled in a hitch frame with traction wheels, one of which is keyed to the shaft, positioned on the ends of the shaft and with a horizontally disposed plate having spaced vertically positioned teeth extended downwardly therefrom carried by and also driven by the said shaft.

Other features and advantages of the invention will appear from the following description taken in connection with the drawings wherein:

Figure 1 is a plan view of the improved horizontally rotating harrow, the parts illustrating the shaft mounting and traction wheels being broken away and shown in section.

Figure 2 is a side elevational view of the harrow.

Figure 3 is a detail looking upwardly toward the under surface of the harrow element.

Figure 4 is a vertical section taken on line 4—4 of Figure 2 showing the harrow element and mounting thereof.

Figure 5 is a detail showing a side elevational view of the harrow mounting element.

Figure 6 is a detail illustrating the mounting of one of the harrow teeth in a disc or plate.

Figure 7 is a side elevational view illustrating a carrier with which the harrow is transported to and from a field or the like.

Referring now to the drawings wherein like reference characters denote corresponding parts the improved horizontally revolving harrow of this invention includes a disc 10 having harrow teeth 11 extended downwardly therefrom, and an axle 12 having traction wheels 13 and 14 on the ends thereof, a brace 15 having a yoke 16 on one end in which the disc 10 is journaled by a shaft 17 and having arms 18 and 19 on the opposite end in which the axle 12 is journaled, and a hitch 20 having a frame with arms 21 and 22, the ends of which are also journaled on the axle 12.

The disc 10 is provided with a plurality of radially disposed spaced threaded openings 23 in which studs 24 at the upper ends of the teeth 11 are threaded and, as illustrated in Figure 6, the teeth are provided with collars 25 that engage the under surface of the disc 10. The lower end of the teeth 11 are formed with points 26.

The disc 10 is attached to a flange 27 on the lower end of the shaft 17 by bolts 28 and the shaft is journaled in bearings 29 and 30 of upper and lower hubs 31 and 32 of the yoke 16. A sprocket 33, which is keyed to the shaft 17 is positioned between the hubs 31 and 32.

The disc 10, forming the harrow is spaced from the axle 12 by the brace 15, the axle being journaled by bearings 34 and 35 in the ends of the arms 18 and 19, respectively. The axle is retained in operative position by set collars 36 and 37 at the opposite ends of the bearing 34, and 38 and 39 at the opposite ends of the bearing 35.

The axle is provided with a sprocket 40 over which a chain 41 is trained and, as illustrated in Figure 1, the chain is also trained over the sprocket 33, whereby with the sprocket 40 keyed to the axle 12 the disc 10 is rotated as the axle turns.

The traction wheel 13 is keyed to the end of the axle 12 with a key in a keyway 42 and the traction wheel 14 is freely journaled on the end of the shaft whereby one of the wheels may remain substantially stationary to facilitate turning corners. The axle is provided with collars 43 and 44 that retain the wheels in position upon the axle and cotter pins, or the like as indicated by the numerals 45 and 46 may be placed through the ends of the axle. Washers 47 are positioned between the cotter pins and ends of the hubs of the traction wheels.

The arms 21 and 22 of the hitch frame are provided with bearings 48 and 49 by which the frame is journaled on the axle and set collars 50 and 51 are provided at the ends of the bearing 48, with similar collars 52 and 53 at the ends of the bearing 49.

The axle 12 may also be provided with an idler sprocket 54 that may be held by a set collar 55. This sprocket may be used for moving the harrow with the low wheel tractor like lift and a chain.

The traction wheels 13 and 14 are provided with lugs 56 and 57, respectively to facilitate rotating the axle with the harrow operating.

The forward end of the hitch 20 may be attached by a bolt 58 to a drawbar 59 of a tractor with the bolt extended through one of the spaced openings 60 thereof.

The device may be provided with a carrier having a platform 61 and the platform, which is mounted on wheels 62, may be provided with blocks 63 and 64 to facilitate positioning the harrow elements thereon.

With the parts arranged in this manner the disc 10 will be rotated horizontally and as the harrow is drawn over a field with the harrow drawn cross wise over plowed furrows the soil will be substantially pulverized by the teeth 26.

It will be understood that modifications may be made in the design and arrangement of the parts without departing from the spirit of the invention.

What is claimed is:

In a horizontally revolving harrow, the combination which comprises a horizontally disposed disc, spaced radially disposed vertically positioned teeth removably mounted in the disc and extended downwardly therefrom, a vertically disposed shaft mounted on the disc and extended upwardly therefrom, a horizontally disposed transversely positioned axle spaced from the disc, traction wheels positioned on the ends of the axle, means keying one of said traction wheels to the axle, a brace having a yoke on one end with vertically positioned upper and lower hubs at the end in which the vertically disposed shaft of the disc is journaled and having outwardly extended arms on the opposite end in the ends of which the axle is journaled, sprockets positioned on the axle and shaft, the sprocket positioned on the vertically disposed shaft being mounted between the upper and lower hubs providing spacing means retaining the disc with the teeth thereon at a predetermined elevation in relation to the bracket, an endless chain trained over said sprockets, and a hitch having outwardly extended arms the ends of which are journaled on said axle.

References Cited in the file of this patent

UNITED STATES PATENTS

| | | |
|---|---|---|
| 89,791 | Quick | May 4, 1869 |
| 518,363 | Brookens | Apr. 17, 1894 |
| 1,629,678 | Burrow | May 24, 1927 |

FOREIGN PATENTS

| | | |
|---|---|---|
| 88,251 | Austria | May 10, 1922 |